United States Patent [19]

Inanuma et al.

[11] Patent Number: 4,978,181

[45] Date of Patent: Dec. 18, 1990

[54] SUNSHADE

[75] Inventors: Minoru Inanuma, Hachioji; Shumpei Ohara, Tokyo; Yukio Sano, Shiki; Akihiro Goto, Urawa; Shinji Sasamoto, Narashino; Eiji Kaneko, Tokyo; Takashi Miyao, Sayama; Yukio Torii, Ichikawa; Keijiro Umemoto, Chiba; Ryo Hirako, Hachioji; Nobuo Suzuki, Akishima; Tadashi Shingu, Hachioji, all of Japan

[73] Assignees: Kajima Corp.; Tachikawa Corp.; Teijin Chemicals Ltd., all of Japan

[21] Appl. No.: 210,879

[22] Filed: Jun. 24, 1988

[30] Foreign Application Priority Data

Jul. 10, 1987 [JP] Japan ............................ 62-106782[U]

[51] Int. Cl.$^5$ ............................ G02B 5/26; G02B 5/28
[52] U.S. Cl. ........................................ 350/1.7; 350/1.6; 350/166; 350/263
[58] Field of Search ................. 350/1.7, 166, 431, 1.6, 350/164, 263

[56] References Cited

U.S. PATENT DOCUMENTS

| | | | |
|---|---|---|---|
| 3,682,528 | 8/1972 | Apfel et al. | 350/1.7 |
| 4,168,332 | 9/1979 | Leinen et al. | 427/160 |
| 4,256,808 | 3/1981 | Roy et al. | 350/1.7 |
| 4,556,277 | 12/1985 | Fan et al. | 350/1.7 |
| 4,581,282 | 4/1986 | Higgins et al. | 350/1.7 |
| 4,710,426 | 12/1987 | Stephens | 350/1.7 |
| 4,802,737 | 2/1989 | Denton | 350/166 |

FOREIGN PATENT DOCUMENTS

| | | |
|---|---|---|
| 86/00832 | 2/1986 | PCT Int'l Appl. |
| 1075113 | 7/1967 | United Kingdom |
| 1367590 | 9/1974 | United Kingdom |
| 1413463 | 11/1975 | United Kingdom |
| 2187779 | 9/1987 | United Kingdom |

Primary Examiner—Bruce Y. Arnold
Assistant Examiner—Martin Lerner
Attorney, Agent, or Firm—Ostrolenk, Faber, Gerb & Soffen

[57] ABSTRACT

A sunshade composed of a transparent substrate, a first base and a second base which are provided on the both surfaces of the substrate, an infrared ray-reflecting layer which is provided on the first base and which reflects infrared rays, and a sun light-reflecting layer which is provided on the second base and which reflects a sun radiant energy with partly transmitting visible rays. The infrared ray-reflecting layer may optionally be coated with a protective layer. At least one of the protective layer, the first base and the second base has a rough surface which may diffusively reflect the light as reflected by the infrared ray-reflecting layer and the sun light-reflecting layer. In place of formation of the rough surface, a light-diffusing agent may be incorporated into the substrate, the both bases or the protective layer.

19 Claims, 5 Drawing Sheets

SUNSHADE

FIELD OF THE INVENTION

The present invention relates to sunshades and, in particular, to those capable of properly controlling a sun light as shining into rooms, for example, horizontal or vertical blind slats, curtain clothes, roll blind clothes, exterior louvers, pent roofs, lighting top lights, sun roofs, transparent roofs, window glasses, etc.

DESCRIPTION OF THE RELATED ART

As one kind of blind slats, a slat as composed of a transparent synthetic resin substrate, one surface of which has been processed to have a sun light-reflecting layer made of a thin metal film capable of properly reflecting a sun light and the other surface of which has been processed to have an infrared ray-reflecting layer for reflecting an outdoor radiant heat, has been proposed. The slat of the kind may partly transit a visible ray therethrough, and therefore, in a day time while the outdoor area is lighter than the indoor area, it is possible to see outdoor views through a blind composed of the slats of the kind even when the blind is in a completely shut state. In addition, the slat has a function of properly controlling a visible ray with shielding a sun light heat in a summer time and additionally a function of elevating a room-heating effect by preventing transmission of an indoor radiant with properly controlling a visible ray to penetrate therethrough in a winter time.

However, the slat of the said kind positively reflects an indoor light because of the sun light-reflecting layer and the infrared ray-reflecting layer. Particularly in the night-time, the light as emitted from interior illuminators is reflected indoors by the slats so that the difference in the luminance between the light-reflecting parts and the other parts in the slats becomes too large, whereby the surfaces of the slats disadvantageously glitter to give an unpleasant feeling to residents. This is an inconvenient problem. On the contrary to this, during daytime, the sun light positively reflects on the slats because of the sun light-reflecting layer thereof and the thus reflected light would give a glittering light and an unpleasant feeling to passersby and residents in other buildings. This is another problem.

SUMMARY OF THE INVENTION

One object of the present invention is to provide a sunshade which does not impart a dazzling or the like unpleasant feeling to residents in the nighttime.

Another object of the present invention is to provide a sunshade which may absorb glow and heat near windows in a summer time and which may elevate a room-heating effect in a winter time.

Still another object of the present invention is to provide a sunshade which may reduce impartation of a dazzling or the like unpleasant feeling to outdoor passersby and residents in other buildings.

In order to attain the said objects, there is provided by the present invention a blind composed of a transparent substrate, an infrared ray-reflecting layer capable of reflecting an infrared ray, which is provided on the substrate, a sun light-reflecting layer capable of reflecting a sun radiant energy with partly transmitting visible rays therethrough, which is also provided on the substrate, and diffusive means capable of diffusively reflecting the light as reflected by the infrared ray-reflecting layer and sun light-reflecting layer, which is provided on at least one of the substrate, infrared ray-reflecting layer and sun light-reflecting layer.

The other objects of the present invention will be obvious from the embodiments of the present invention which are explained in detail hereinafter and will be set forth in the claims attached hereto. Other numerous advantages of the present invention, which are not mentioned herein, will be apparent to those skilled in the art.

DESCRIPTION OF THE PREFERRED EMBODIMENTS

Figure 1:
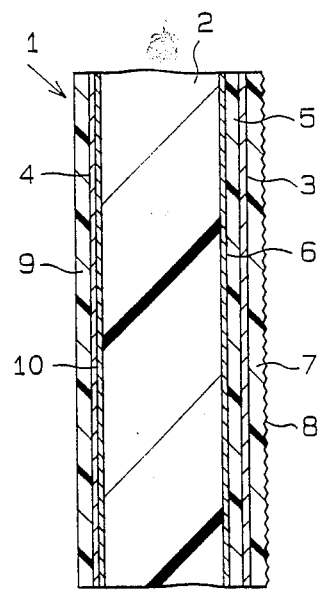
FIG. 1 is a partial sectional view to show a first embodiment of a slat material of the present invention.

A first embodiment of the present invention will be explained hereunder with reference to FIGS. 1 and 2. A substrate 2 of a blind slat material 1 is made of a transparent synthetic resin such as a polycarbonate resin or an acrylic resin, or a transparent glass or the like. One surface of the substrate 2, which faces indoors, is coated with an infrared ray-reflecting layer 3, and the other surface with a sun light-reflecting layer 4. These reflecting layers 3 and 4 will be explained. The infrared ray-reflecting layer 3 is processed on one surface of a first base 5 made of a transparent resin film. This has a function of reflecting at least 50% or more infrared rays having an infrared ray wavelength range of from 5 to 40 $\mu$m, and this may transmit visible rays. The first base 5 is adhered to the substrate 2 via an adhesive layer 6, and this has the infrared ray-reflecting layer 3 on the opposite side. The outer surface of the infrared ray-reflecting layer 3 is coated with a transparent protective layer 7.

As the transparent and filmy first base 5, films of organic compounds, for example, polyolefins such as polyethylene or polypropylene; aromatic polyesters such as polyethylene terephthalate or polyethylene naphthalate; polycarbonates; vinyl halides such as vinyl chloride, vinylidene chloride or vinylidene fluoride; polyamides such as nylon 6 or nylon 66, etc. may be used, and in particular, a biaxially stretched film of polyethylene terephthalate is preferred.

The protective layer 7 may be made of anyone selected from acrylic resins such as polymethyl methacrylate, silicone resins such as polymers obtained from ethyl silicate, acrylonitrile resins such as polyacrylonitrile or polymethacrylonitrile, as well as polypropylene, polyester resins, melamine resins, urethane resins, silicon oxide, magnesium fluoride, etc. The protective layer 7 is formed, for example, by laminating a film of the above-mentioned material on the infrared ray-reflecting layer 3 via an adhesive or by coating a solution of the above-mentioned material as dissolved in a solvent on the infrared ray-reflecting layer 3.

Figure 2:
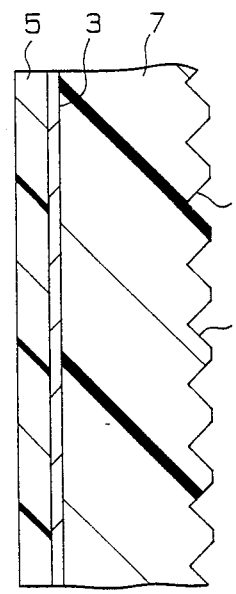
FIG. 2 is a partly enlarged sectional view to show the first embodiment of the slat material of FIG. 1.

As shown in FIG. 2, a surface 8 of the protective layer 7 is made rough by sand blast treatment. The rough surface 8 is made to have a density of such degree that the outdoor view can be seen through the slat material 1. Accordingly, the protective layer 7 has a function that the light as penetrated through the infrared ray-reflecting layer 3 and the light as reflected by the infrared ray-reflecting layer 3 are diffused by n the rough surface 8.

The sun light-reflecting layer 4 is an aluminium layer as coated on one surface of a second base 9 by vacuum evaporation plating, and the second base 9 may be made of the same material as the above-mentioned first base 5. The layer 4 may reflect 30% or more sun radiant energy having a wavelength falling within the range of from 0.4 to 2.1 μm and may transmit 50% or less visible rays having a wavelength of from 0.38 to 0.78 μm. The second base 9 is thus processed to have the sun light-reflecting layer 4, on the inside thereof, and the layer 4 is adhered to the substrate 2 via the adhesive layer 10.

In a blind composed of the slat materials 1 having the above-mentioned constitution, since each slat material 1 has the infrared ray-reflecting layer 3 and the sun light-reflecting layer 4 as adhered to the transparent substrate 2, the thermal absorption of the slats may be prevented because of the sun radiant energy-reflecting capacity of the sun light-reflecting layer 4 and the indoor heat radiation may be minimized because of the infrared ray-reflecting capacity of the infrared ray-reflecting layer 3 so that the glow and heat near windows in a summer time may be applied to a curtain 91, a window 93, an exterior louver 94, 95, a roof 98, a penthouse roof, lighting top lights, a sun roof, a transparent slate, etc. capacity of the infrared ray-reflecting layer 3 with properly controlling the transmission of visible rays therethrough because of the visible ray-transmitting capacity of the sun light-reflecting layer 4 so that these are effective for elevating a room-heating effect.

In a night time while the outdoor area is darker than the indoor area, if the blind is completely shut with setting the infrared ray-reflecting layer 3 of all the slat materials 1 thereof to be in the indoor side, the light as emitted from interior illuminators is reflected by the infrared ray-reflecting layer 3 and the sun light-reflecting layer 4, while the light as reflected by these layers 3 and 4 could be diffusively reflected because of the rough surface 8 of the protective layer 7. Accordingly, the images of the interior illuminators are not mirrored or reflected Sharply on the slat materials 1, and the residents in the room with the blind would not have any dazzling or the like unpleasant feeling.

In the above-mentioned embodiment, the slat material 1 is composed of the substrate 2 both surfaces of which have been coated with the infrared ray-reflecting layer 3 and the sun light-reflecting layer 4 individually, and the protective layer 7 which covers the infrared ray-reflecting layer 3 has been processed to have the rough surface 8. In addition, the slat material may be composed of other various modifications of the respective reflective layers, as mentioned below.

Figure 3:
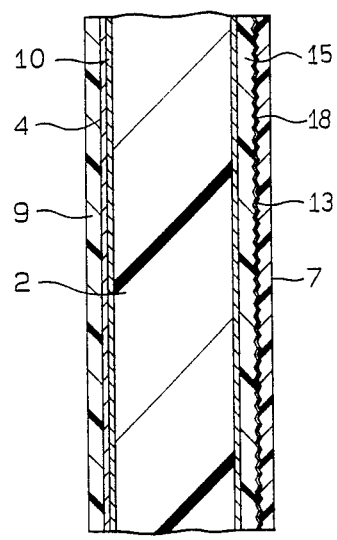
FIG. 3 is a partial sectional view to show one modification of the first embodiment of the slat material of the present invention.

(A) FIG. 3 is referred to. A first base 15 is processed to have a rough surface 18, and the rough surface 18 of the first base 15 is coated with an infrared ray-reflecting layer 13. The layer 13 is processed to have a rough surface. In this case, since the degree of the roughness of the rough surface 18 is larger than that of the film thickness of the infrared ray-reflecting layer 13, the surface of the reflecting layer 13 as formed on the rough surface 18 may be accordingly rough.

Figure 4:
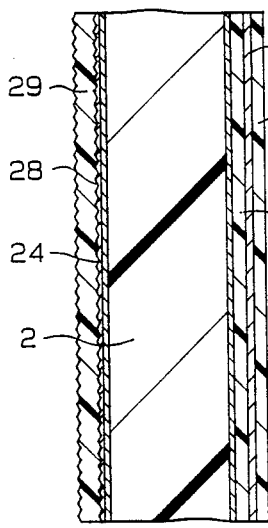
FIG. 4 is a partial sectional view to show another modification of the first embodiment of the slat material of the present invention.

(B) FIG. 4 is referred to. The surface of a second base (29) on which a sun light-reflecting layer 24 is provided is processed to have a rough surface 28, and the surface of a second base 29 is coated with the sun light-reflecting layer 24, so that the surface of the reflecting layer 24 is made rough.

Figure 5:
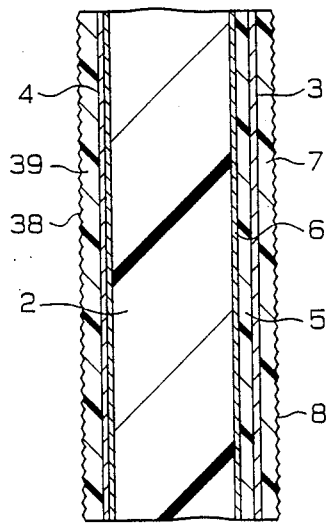
FIG. 5 is a partial sectional view to show still another modification of the first embodiment of the slat material of the present invention.

(C) FIG. 5 is referred to. Both the surface of the protective layer 7 as coated on the infrared ray-reflecting layer 3 and the surface of a second base 39 as coated on the sun light-reflecting layer 4 are processed each to have a rough surface 38. Because of such constitution, the light as reflected by the both reflecting layers 3 and 4 may diffusively reflected so that the dazzling by the blind slats may be prevented in both the outdoor area and the indoor area. In particular, when the slat materials 1 are set nearly horizontally with the sun light-reflecting layer 4 being above the substrate, the image formation of the reflected light on a ceiling by the sun light-reflecting layer 4 may be prevented so that the indoor environment for living may be improved.

(D) An emulsion is incorporated in the formation of the substrate 2. Namely, the light as penetrating through the substrate 2 may be diffusively reflected because of the fine emulsion grains in the substrate 2.

Figure 6:
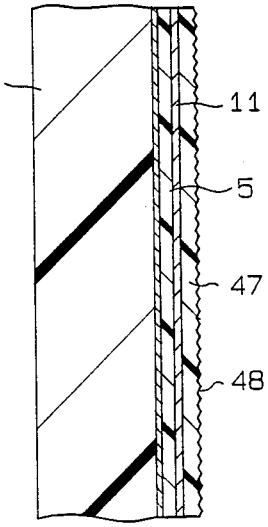
FIG. 6 is a partial sectional view to show further modification of the first embodiment of the slat material of the present invention.

In addition, the present invention includes still another modification as shown in FIG. 6. More precisely, a thin metal film layer 11 having both the capacity of the above-mentioned infrared ray-reflecting layer 3 and the capacity of the above-mentioned sun light-reflecting layer 4 is provided on one surface of the substrate, and a protective layer 47 as provided to coat the thin metal film layer 11 is processed to have a rough surface 48. Because of such constitution, the same effect as mentioned above can be attained.

The thin metal film layer 11 is made of any one of gold, silver, copper, aluminium, nickel, palladium and tin, or an alloy of these metals, and in particular, it is preferably made of gold, silver, copper or an alloy thereof. The alloy herein referred to may contain conventional inevitable impurities. The thickness of the metal layer is from 30 Å to 600 Å, preferably from 50 Å to 300 Å. For formation of the thin metal film layer 11 any one of vacuum evaporation plating method, cathode sputtering method, plasma melt-spraying method, gaseous plating method, chemical plating method, electric plating method and combination thereof can be employed. In addition, the thin metal film layer 11 may be formed directly on the substrate 2.

The thin metal film layer 11 thus formed may reflect 30% or more sun radiant energy having a wavelength range of from 0.4 to 2.1 $\mu$m and may reflect 50% or more infrared rays having a wavelength range of from 5 to 15 $\mu$m and additionally may transmit 50% or less visible rays having a wavelength range of from 0.38 to 0.78 $\mu$m.

Figure 7:
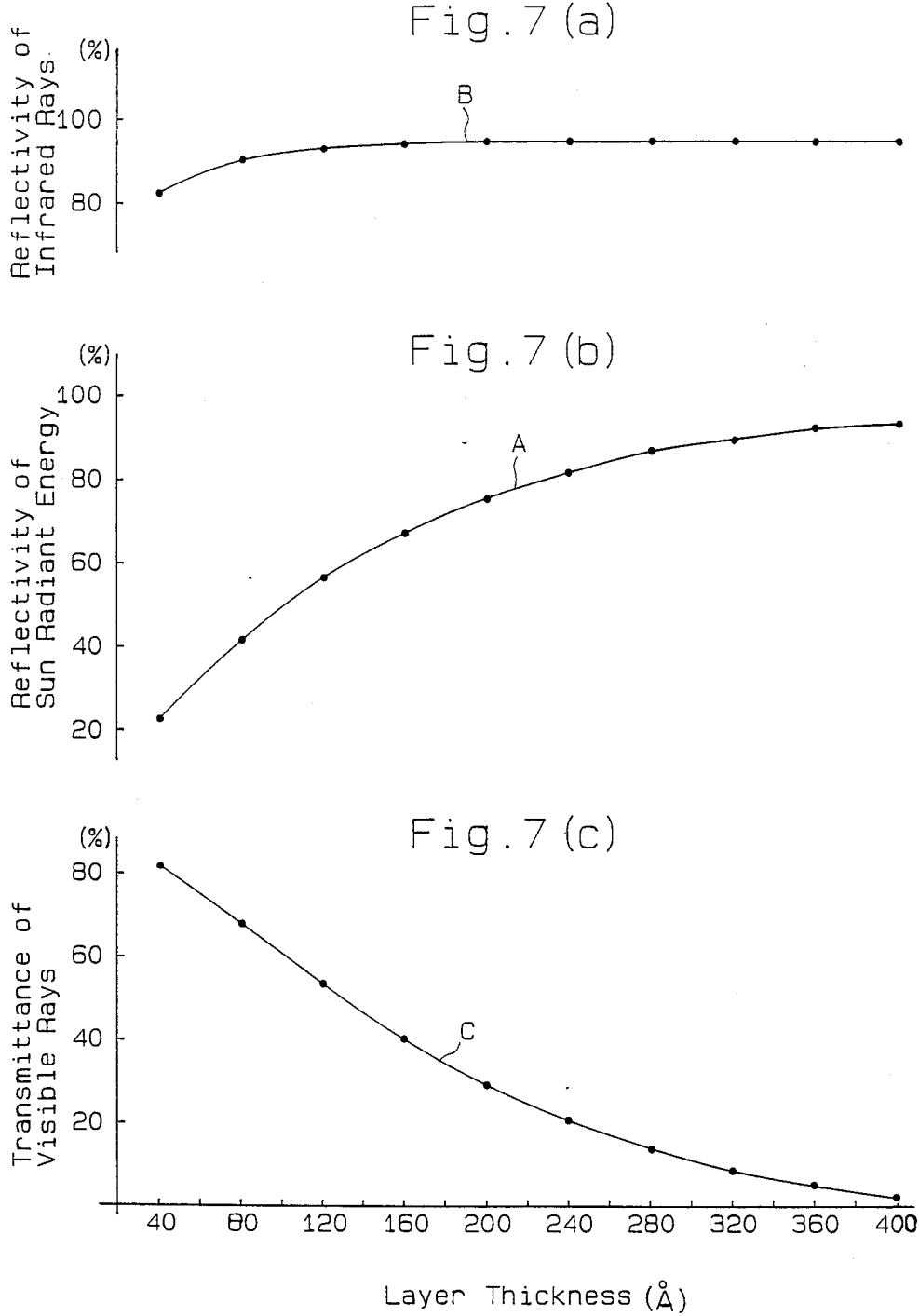
FIGS. 7(a) to 7(c) are graphs to show the properties of the slat material of the modification of FIG. 6 where a thin metal film is made of silver.

For instance, when the thin metal film layer 11 is made of silver in the embodiment of the slat material of FIG. 6, the slat material has properties as shown by the curves A, B and C in FIGS. 7(a) to 7(c). Specifically, the curve A shows the reflectivity of the sun radiant energy, which means that the slat material may reflect 30% or more sun radiant energy when this has the metal having a thickness of 60 Å or more. The curve B shows the reflectivity of infrared rays, which means that the slat material may reflect 80% or more infrared rays when this has the metal layer having a thickness of 40 Å or more. The curve C shows the transmittance of visible rays when this has the metal layer having a thickness of 130 Å or more. Accordingly, if the metal film layer 11 is made of a thin silver film having a film thickness of 130 Å or more, the reflectivity of both the sun radiant energy and the infrared rays and the transmittance of the visible rays may be made higher or lower, respectively, than the desired values mentioned above.

Figure 8:
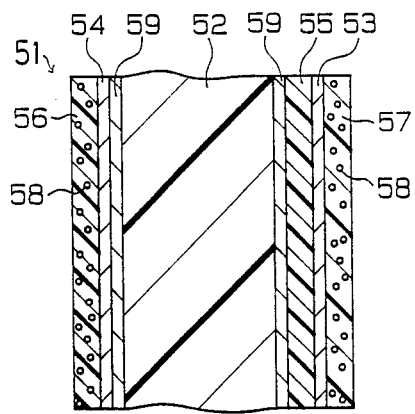
FIG. 8 is a partial sectional view to show a second embodiment of a slat material of the present invention.

Next, a second embodiment of the present invention will be explained hereunder with reference to FIG. 8.

In a blind slat material 51, one surface of substrate 52 is coated with a first base 55 via an adhesive layer 59, and the base 55 is coated with an infrared ray-reflecting layer 53. The other surface of the substrate 52 is coated with a second base 56 via the adhesive layer 59, and a sun light-reflecting layer 54 is interposed between the base 56 and the adhesive layer 59. The infrared ray-reflecting layer 53 is coated with a protective layer 57. The slat material 51 of the second embodiment is different from the slat material 1 of the above-mentioned first embodiment, in that a light-diffusing agent 58 has been incorporated into the second base 56 and the protective layer 57 so that the light as reflected by the infrared ray-reflecting layer 53 and/or the sun light-reflecting layer 54 may be diffused by the light-diffusing agent 58. The surface of the protective layer 57 is not roughened. As the material of the first and the second bases 55, 56 is preferred a biaxially stretched polyethylene terephthalate film because of the high thermal stability and dimension stability and of the easiness of the incorporation of the light-diffusing agent 58 thereinto, like the above-mentioned first embodiment.

As the light-diffusing agent 58, for example, can be used powders of inorganic substances such as kaolin, clay, CaCo$_3$, TiO$_2$, SiO$_2$ sol or the like, or powders of organic substances such as thermosetting polyimide resins, etc. The light-diffusing agent 58 for use in the present invention may be any others than the above-mentioned substances, provided that these may be incorporated into the second base 56 or the protective layer 57 without substantially lowering the strength of the physical properties thereof.

The light-diffusing agent 58 may have an apparent grain size of from 0.01 $\mu$m to 50 $\mu$m, and the shape thereof is not specifically limited. For incorporation of the light-diffusing agent 58 into the base 56 and/or the layer 57, for example, the following methods can be employed.

(a) The light-diffusing agent 58 is blended into a melted synthetic resin, and the resin mixture is filmed to form the second base 56 or the protective layer 57.

(b) The light-diffusing agent 58 is blended into a melted synthetic resin and the resin mixture is filmed. The resulting film is laminated to form the second base 56 or the protective layer 57.

(c) The light-diffusing agent 58 is dispersed into a solution of a synthetic resin as dissolved in a solvent, and the resulting dispersion is coated on a resin film to be used as the second base 56 or the protective layer 57. The thus formed resin sheet is laminated to form the base 56 or the protective layer 57.

(d) The light-diffusing agent 58 is dispersed in a solution of a synthetic resin as dissolved in a solvent, the resin being same as the material of the second base 56 of the protective layer 57, and the resulting dispersion is directly coated on the second base 56 or the protective layer 57.

The amount of the light-diffusing agent 58 to be incorporated into the slat material 51 may be represented by the ratio of the amount of the diffusively transmitted light to the amount of the total transmitted light in the light as penetrating through the slat material 51. This is mentioned in JIS T8147, 6.3.7 as "surface abrasion resistance". This is generally designated as "cloudiness or turbidity", and the definition thereof is just same as the definition referred to in JIS T8147, 6.3.7. In order to keep the degree of the light diffusion favorable the cloudiness of the slat material 51 is made to be from 5% to 80%, preferably from 10% to 70%, whereby the light diffusion can be attained without interfering with the visible field.

The blind composed of the slat materials 51 of the second embodiment may display the following effects, like the blind of the above-mentioned first embodiment.

In a nighttime while the outdoor area is darker than the indoor area, if the blind is completely shut with setting the infrared ray-reflecting layer 3 of the slat materials 1 thereof to be in the indoor side, the light as emitted from interior illuminators is reflected by the infrared ray-reflecting layer 53 and the sun light-reflecting layer 54, while the light as reflected by these layers 53 and 54 could be diffusively reflected because of the light-diffusing agent 58 as incorporated into the base 56 and the protective layer 57. Accordingly, the images of the interior illuminators are not mirrored or reflected sharply in the slat materials 51, and the residents in the room with the blind would not have any dazzling or the like unpleasant feeling. On the contrary to this, during day time, the sun light could diffusively reflect on the slat materials 51 because of the light-diffusing agent 58 as incorporated thereinto so that the impartation of a glittering light and an unpleasant feeling to passersby and residents in other buildings could be reduced. In the above-mentioned second embodiment, the light-diffusing agent-incorporated layer has been provided on both the indoor-facing surface and the outdoor-facing surface of the substrate. However, even when the layer is provided on one surface of the substrate, the same effect can also be attained.

In the above-mentioned second embodiment, the slat material 51 is composed of the substrate 52 both surfaces of which have been coated with the infrared ray-reflecting layer 53 and the sun light-reflecting layer 54 individually, and the protective layer 57 which covers the infrared ray-reflecting layer 53 and the second base 56 for the sun light-reflecting layer 54 contain the light-diffusing agent 58 so as to obtain the light-diffusing effect. In addition, the slat material of the present invention may be composed of other various modifications as mentioned below.

Figure 9:
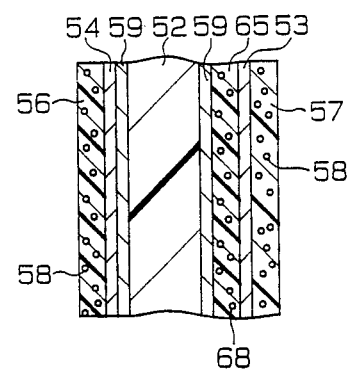
FIG. 9(a) to FIG. 9(c) are partial sectional views to show modifications of the second embodiment of the slat material of the present invention.
Figure 9:
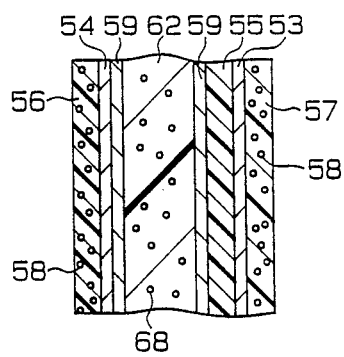
Figure 9:
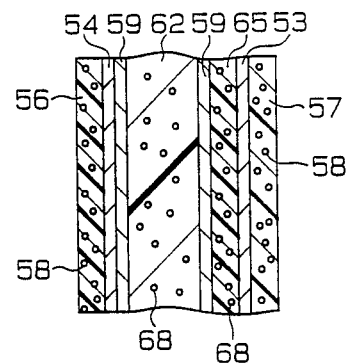
Figure 10:
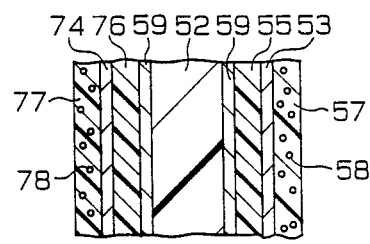
FIG. 10(a) to FIG. 10(g) are partial sectional views to show other modifications of the second embodiment of the slat material of the present invention.
Figure 10:
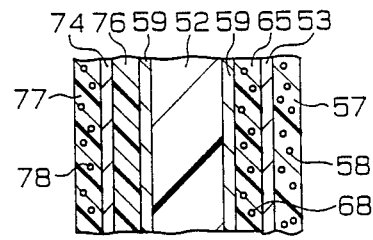
Figure 10:
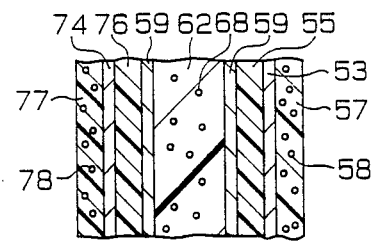
Figure 10:
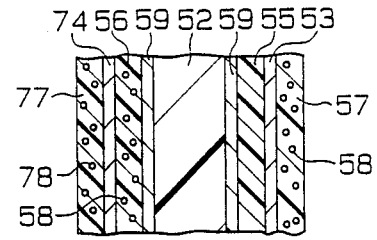
Figure 10:
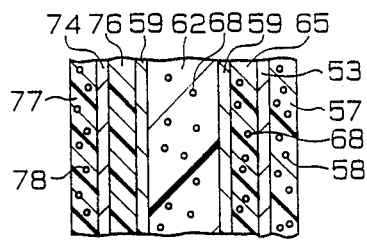
Figure 10:
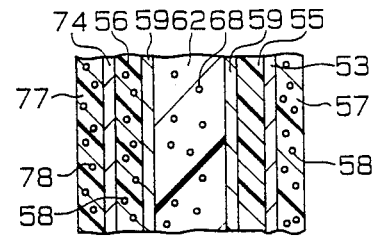
Figure 10:
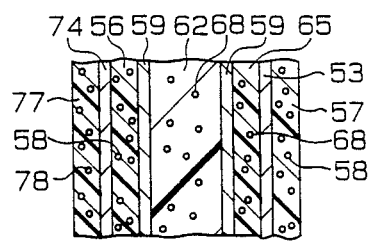

(A) FIG. 9(a), FIG. 9(b) and FIG. 9(c) are referred to. A light-diffusing agent 68 is further incorporated in either or both a first base 65 for forming the infrared ray-reflecting layer 53 or/and a transparent substrate 62, in addition to the second base 56 for forming the sun light-reflecting layer 54 and the protective layer 57.

(B) FIG. 10(a) to FIG. 10(g) are referred to. A second base 76 is adhered to the substrate 52, and a sun light-reflecting layer 74 is coated over a base 76. The sun light-reflecting layer 74 is overcoated by a protective layer 77. The light-diffusing agents 58 and 78 are incorporated in accordance with various combinations of the substrates 52 and 62, the first and second bases 55, 65, 56 an 76, and the both side protective layers 57 and 77.

Figure 11:
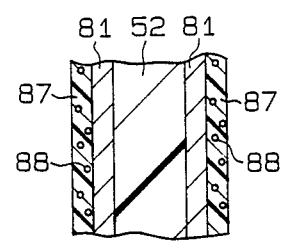
FIG. 11(a) and FIG. 11(b) are partial sectional views to show still other modifications of the second embodiment of the slat material of the present invention.
Figure 11:
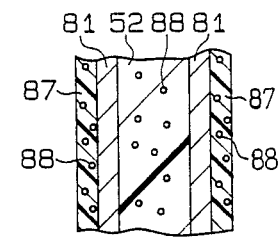
Figure 13:
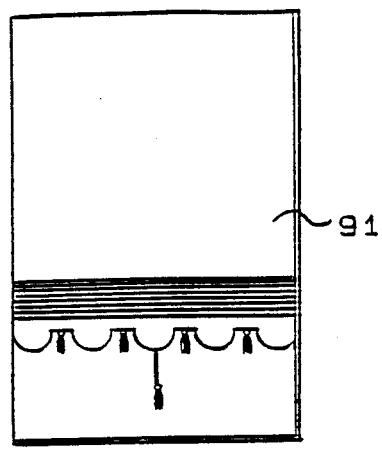
FIG. 13 illustrates a curtain which includes the material of the present invention.
Figure 12:
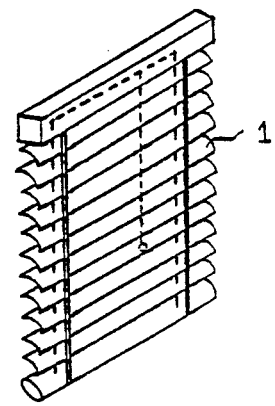
FIG. 12 illustrates a blind which includes the material of the present invention.
Figure 16:
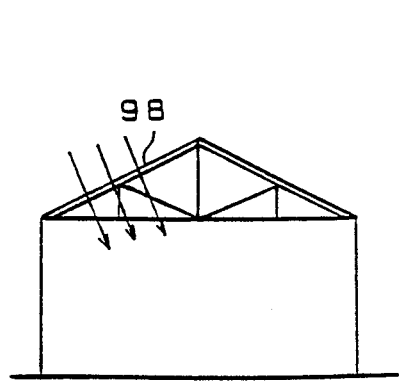
FIG. 16 illustrates a roof which includes the material of the present invention.
Figure 14:
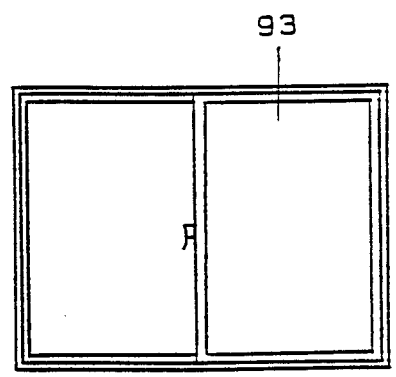
FIG. 14 illustrates a window which includes the material of the present invention.
Figure 15:
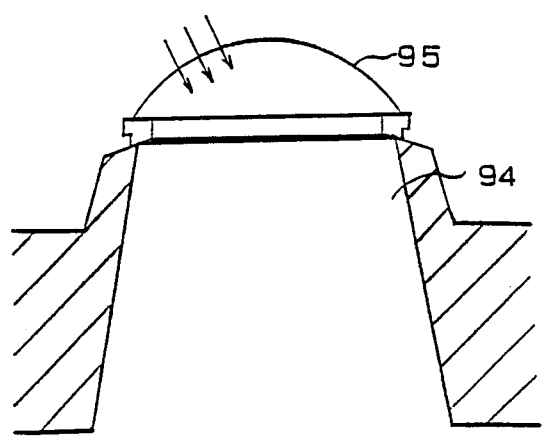
FIG. 15 illustrates an exterior louver which includes the material of the present invention.

In addition, the present invention includes still another modification as shown in FIG. 11(a) and FIG. 11(b). More precisely, a thin metal film layer 81 having both the capacity of the above-mentioned infrared ray-reflecting layer 53 and the capacity of the above-mentioned sun light-reflecting layer 54 is provided on both surfaces of the substrate 52, and a light-diffusing agent 88 is incorporated into a protective layer 87 as provided to coat the thin metal film layer 81. Because of such constitution, the same effect as mentioned above can be attained.

The materials of the thin metal film layer 81 and the formation of the same layer 81 may be same as those of the thin metal film layer 11 in the above-mentioned first embodiment. If the thin metal film layer 81 is formed directly on the substrate 52, it is a matter of course that the protective layer 87 is formed on the surface of the thin metal film layer 81 and the light-diffusing agent 88 is incorporated into the protective layer 87. The thin metal film layer 81 may also have the same capacity as the thin metal film layer 11 used in the above-mentioned first embodiment.

The present invention is not limited to be applied to only the above-mentioned slat materials but may also be applied to curtain clothes, roll blind clothes, exterior louvers, pent roofs, lighting top lights, sun roofs, transparent roofs, transparent slates, window glasses, etc. In addition, the substrate for use in the present invention is not limited to be only a transparent one but any other colored visible ray-transmitting substrates or partly opaque substrates with patterns may also be used in the present invention.

While the invention has been described in detail and with reference to specific embodiments thereof, it will be apparent to one skilled in the art that various changes and modifications can be made therein without departing from the spirit and the scope thereof Accordingly, the present invention is not restricted by any specific embodiments thereof, only the limitations specifically set forth in the claims.

What is claimed is:

1. A sunshade for controlling the amount of sun light shining into a room, the sunshade comprising:
   a transparent substrate for transmitting sun light into the room,
   an infrared ray-reflecting layer provided on said substrate for reflecting infrared rays passing through the sunshade,
   a sun light-reflecting layer provided on said substrate for reflecting a portion of radiant sun light energy passing through the sunshade while partially transmitting visible rays passing through the sunshade, and
   light diffusing means for diffusing light reflected by said infrared ray-reflecting layer and sun light-reflecting layer.

2. A sunshade as claimed in claim 1, wherein said light-diffusing means includes a rough surface.

3. A sunshade as claimed in claim 2, wherein said infrared ray-reflecting layer is coated with a protective layer made of a transparent synthetic resin, said rough surface being formed on said protective layer.

4. A sunshade as claimed in claim 2, wherein said substrate has a base provided thereon, said infrared ray-reflecting layer being coated with a protective layer made of a transparent synthetic resin, said sun light-reflecting layer being formed on said base, said rough surface being formed on said base and said protective layer.

5. A sunshade as claimed in claim 2, wherein said infrared ray-reflecting layer and said sun light-reflecting layer form a single thin metal film layer formed on one surface of said substrate, said thin metal film layer being coated with a protective layer made of a transparent synthetic resin, said rough surface being formed on said protective layer.

6. A sunshade as claimed in claim 5, wherein said thin metal film layer has a thickness of from 50 angstroms to 600 angstroms.

7. A sunshade as claimed in claim 6, wherein said thin metal film layer is made of any one of gold, silver, copper and an alloy thereof.

8. A sunshade as claimed in claim 1, wherein said substrate is coated with a first base and a second base provided thereon, at least one of said infrared ray-reflecting layer and said sun light-reflecting layer being coated with a protective layer made of a transparent synthetic resin, said infrared ray-reflecting layer being formed on a surface of said first base, said sun light-reflecting layer being formed on said second base, said light-diffusing means comprising light-diffusing grains incorporated into at least one of said substrate, first base, second base and protective layer.

9. A sunshade as claimed in claim 8, wherein said infrared ray-reflecting layer and said sun light-reflecting layer include a pair of thin metal film layers formed on both surfaces of said substrate, each of said thin metal film layers being coated with a protective layer made of a transparent synthetic resin, said light-diffusing means comprising light-diffusing grains incorporated into at least one or said substrate and said two protective layers.

10. A sunshade as claimed in claim 1, wherein said sunshade includes a blind.

11. A sunshade as claimed in claim 1, wherein said sunshade includes a curtain.

12. A sunshade as claimed in claim 1, wherein said sunshade includes an exterior louver.

13. A sunshade as claimed in claim 1, wherein said sunshade includes a roof.

14. A sunshade as claimed in claim 1, wherein said sunshade includes a window.

15. A sunshade, comprising:
- a transparent substrate having a first base and a second base provided thereon,
- an infrared ray-reflecting layer for reflecting infrared rays passing through the sunshade, said infrared ray-reflecting layer being formed on a surface of said first base,
- a sun light-reflecting layer for reflecting a portion of radiant sun light energy passing through the sunshade while partially transmitting visible rays passing through the sunshade, said sun light-reflecting layer being formed on said second base, and
- light diffusing means for diffusing light reflected by said infrared ray-reflecting layer and sun light-reflecting layer, the light diffusing means including a rough surface formed on one of said bases.

16. A sunshade as claimed in claim 15, wherein said two bases are each made of biaxially stretched polyethylene terephthalate film.

17. A sunshade for controlling the amount of sun light shining into a room, the sunshade comprising:
- an infrared ray-reflecting layer for reflecting infrared rays passing through the sunshade,
- a sun light-reflecting layer which is opposite to said infrared ray-reflecting layer for reflecting a portion of radiant sun light energy passing through the sunshade while partially transmitting visible rays passing through the sunshade, and
- light-diffusing means for diffusing light reflected by said infrared ray-reflecting layer and sun light-reflecting layer.

18. A sunshade as claimed in claim 17, wherein said light-diffusing means includes a rough surface.

19. A sunshade as claimed in claim 17, wherein said light diffusing means includes a light-diffusing agent.

* * * * *